Aug. 21, 1934. O. F. CARPENTER Re. 19,277

DOOR FOR POULTRY COOPS AND CRATES

Original Filed Oct. 22, 1929

Inventor

Ose F. Carpenter

By Geo. P. Kimmel

Attorney

Reissued Aug. 21, 1934 Re. 19,277

UNITED STATES PATENT OFFICE 19,277

DOOR FOR POULTRY COOPS AND CRATES

Ose F. Carpenter, Brightwood, Va.

Original No. 1,833,559, dated November 24, 1931, Serial No. 401,465, October 22, 1929. Application for reissue June 18, 1934, Serial No. 731,220

3 Claims. (Cl. 217—57)

This invention relates to a spring controlled, latchable, slidable, hinged door designed primarily for use in connection with poultry coops and crates, but it is to be understood that a door, in accordance with this invention may be employed in any connection for which it is found applicable, and the invention has for its object to provide, in a manner as hereinafter set forth, a spring controlled, latchable door so constructed and arranged as to enable it to be released from latched position and further having means coacting therewith for maintaining it in closed position when it is unlatched.

A further object of the invention is to provide, in a manner as hereinafter set forth, a spring controlled, latchable, slidable and hinged door provided with means whereby the controlling spring for the door permanently acts to maintain the door in closed position, and further to set up a door structure whereby a controlling spring of increased length and strength can be employed to prevent the free movement of the door on its hinge, which results in the door being normally maintained in closed position.

A further object of the invention is to provide, in a manner as hereinafter set forth, a slidably mounted hinged door so constructed and arranged as to enable it to be shifted the full width of the door opening of the coop or crate and whereby a latch of materially increased length can be employed for entering the door transversely of the latter to latch it.

Further objects of the invention are to provide, in a manner as hereinafter set forth, a spring controlled, latchable, slidable, hinged door for coops or crates which is simple in its construction and arrangement, strong, durable, compact, thoroughly efficient in its use, readily assembled and comparatively inexpensive to manufacture.

With the foregoing and other objects in view the invention consists of the novel construction, combination and arrangement of parts as hereinafter more specifically described, and illustrated in the accompanying drawing wherein is shown an embodiment of the invention, but it is to be understood that changes, variations and modifications can be resorted to which fall within the scope of the claims hereunto appended.

In the drawing wherein like reference characters denote corresponding parts throughout the several views:—

Figure 1:
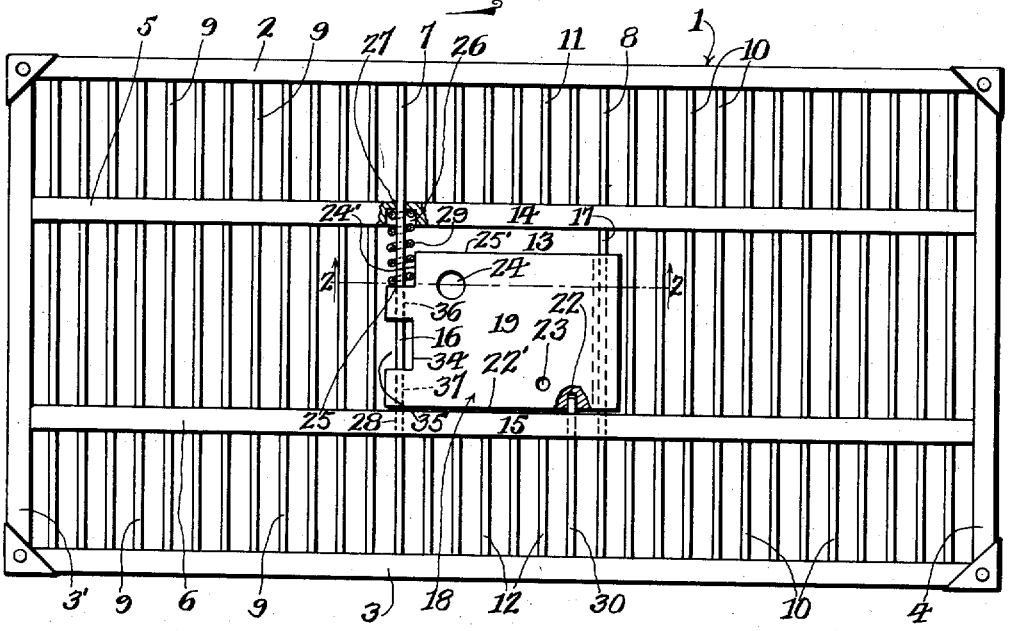
Figure 1 is a top plan view, partly in section of a coop showing the adaptation therewith of a spring controlled, slidable, latchable, hinged door in accordance with this invention.
Figure 2:
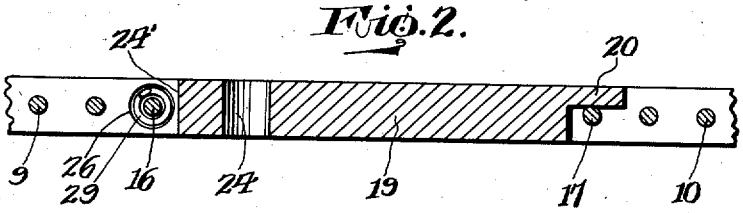
Figure 2 is a fragmentary view in longitudinal section of the top of a coop or crate and further illustrating a door installed therewith, and with the door shown in longitudinal section on line 2—2 Figure 1.

Referring to the drawing 1 generally denotes the slatted top of a poultry coop or crate which includes a pair of side frame members 2, 3, a pair of end frame members 3′, 4, spaced, parallel brace bars 5, 6 extending from end frame bar 3′ to end frame bar 4 and suitably secured therewith. The bars 5, 6 are arranged in spaced relation with respect to the side frame members 2, 3. Connected to the frame member 2 and extending through the bars 5, 6 as well as being connected to the frame member 3 is a slat 7. Connected to the frame member 2 and extending through the bars 5, 6, as well as being connected to the frame member 3 is a slat 8. The slats 7 and 8 are arranged in parallelism and spaced from each other. Positioned between the slat 7 and the end frame member 3′ is a set of spaced slats 9. Positioned between the slat 8 and the end frame member 4 is a set of spaced slats 10. The slats of said sets extend from the side frame member 2, through the bars 5, 6 and are connected to the side frame member 3. Arranged between the slats 7 and 8 is a series of spaced slats 11 which extend from the side frame member 2 to the bar 5. Arranged between the slats 7 and 8 is a series of slats 12 which extend from the bar 6 and are connected to the side frame member 3. The slats of the sets 11 and 12 are of materially less length than the length of the slats of the sets 9 and 10.

The top 1 is provided with a door opening 13, one wall of which is formed by that portion of the bar 5 between the slats 7 and 8 and such portion is indicated at 14. Another wall of the door opening 13 is provided by that portion of bar 6 between the slats 7 and 8, and such portion is indicated at 15. Another of the walls of the opening 13 is provided by that portion of the slat 7 between the bars 5 and 6, and such portion is indicated at 16, and the other wall of the door opening 13 is provided by that portion of the slat 8 between the bars 5 and 6, and such portion is indicated at 17. The portion 16 of the slat 7 provides a pivot or hinge for the door which is referred to generally by the reference character 18. The portion 17 of the slat 8 provides a combined support and guide for the door 18. The portion 16 of the slat 7 also constitutes a guide for the door 18.

The door 18 comprises a rectangular body portion 19 of greater length than the door opening 13, but of less width than the width of door opening 13 to permit of the door 18 being shifted towards and from the bar 5 or the bar 6. One end of the body portion 19 has its inner face rabbeted to form a reduced extension 20 which slides upon the portion 17 of the slat 8. The body portion 19 in proximity to the extension 20 is formed with a socket 22 which opens at the side edge 22′ of said body portion and is adapted to receive a latching member to be presently referred to. The body portion 19 is furthermore provided in proximity to the socket 22 with an opening 23 for the passage of the wire of a seal or for other purposes. The body portion 19 is also formed with an opening 24 of greater diameter than the opening 23 which is used for the insertion of a thumb or finger or other means, for the purpose of shifting body portion 19 towards the bar 5. The body portion 19 has one corner at its other end cut away as at 24′ whereby the other side edge of said body portion will be formed of two side edge portions 25, 25′ the former being of less length than the latter. The edge portions 25, 25′ extend in spaced parallel planes and the former provides an inset abutment for a purpose to be presently referred to.

The bar 5 is formed with a socket 26 which opens at the inner side of such bar 5 and opposes the abutment provided by the side edge portion 25. The bars 5, 6 are provided with openings 27, 28 respectively, for the passage of the slat 7.

The door 18 at that end provided with the abutment is formed with an inwardly extending cutout 34 providing a recess 35. The same end of door 18 is formed with a pair of endwise opposed openings 36, 37 which are spaced from each other by the recess 35. Extending through the openings 36, 37 is the portion 16 of the slat 7 whereby the door 18 is hinged to the top of the crate.

Mounted in the socket 26, bearing against the abutment provided by edge portion 25 and surrounding the slat 7 is a controlling spring 29 for the body portion 19 and which tends to maintain the body portion against the bar 6 or tends to permanently shift the door in a direction towards the bar 6. The spring 29 also provides means for maintaining the door 18 in engagement with the latching member 30 which consists of a slat connected to the frame member 3 and extending through the bar 6 and projecting a substantial distance into the door opening 13. The inner end of the latching member 30 is adapted to engage in the socket 22 for the purpose of latching door 18 in closed position.

The spring 29 also acts to maintain the door against the bar 6 when the door is out of engagement with the latching member 30. The providing of the bar 5 and the door 18 with the socket 26 and abutment respectively enables the employment of a coiled spring of greater length than the springs heretofore used for this purpose, whereby a spring of greater strength can be utilized for the purpose of normally tending to maintain the door in closed position, whether the door be latched to or released from its latching means.

In the form shown provision is made for the employment of a spring or other controlling spring for the door which is of materially greater length than the distance between the side edge of the door and the bar 5 or the other side edge of the door with respect to the bar 6.

A further advantage of providing the structure with the cut away 24′ and edge portion 25 forming the abutment is to allow the door to shift on the hinged rod or slat 7 the full width of the space between the door and bar 5, thus allowing the latch 30 to be longer than it would be without the use of the cut away 24′ and edge portion 25 forming the abutment where a coiled spring is employed for holding the door in latched position. This is a particular advantage in coops where the spacing between the slats in the top must be close to prevent chickens from putting their heads through, which according to shipping regulations must not exceed one inch. The projecting portion of the member 30, that is to say that part of member 30 which extends into the door opening 13 should be from about three-quarters of an inch to seven-eighths of an inch long to prevent accidental opening while the coops are being handled.

The cutout 34 serves to prevent the door from binding on the hinge rod in case the door warps, while at the same time it serves as a place to insert the finger between the door and slat 7 for the purpose of shifting the door as heretofore mentioned.

It is well known that in boring an end opening in a door, the auger is not started at one side edge and continued through to the other side edge, due to the fact that if the auger was continued entirely through, the opening when completed would be at an inclination and not parallel to the transverse median of the door body. The end opening is formed by starting the auger at one side edge and continuing for a portion of the width of the door, the auger is then removed and started from the other side edge and continued for the remaining portion of the width of the door, but in each operation the result is that the bores do not register at their inner ends, as after boring from each side the inner portions of the bores begin to incline thereby providing an opening having a wall which will bind against the hinge rod and impair the sliding action of or bind the door from movement. Further as the door of the coop is subjected to inclement weather it will warp and increase the binding action on the rod. To overcome the foregoing objection the cutout 34 is provided which removes the inner inclined portions of the bores whereby the remaining portions of the latter will be in true alignment and avoid any binding action of the walls of the bores on the hinge rod when the door is shifted.

It is thought the many advantages of a spring controlled, slidable, latchable, hinged door in accordance with this invention and for the purpose set forth can be readily understood, and although the preferred embodiment of the invention is as illustrated and described, yet it is to be understood that changes in the details of construction can be had which fall within the scope of the invention as claimed.

What I claim is:

1. In combination, a structure provided with means to form a rectangular door opening having a pair of sides and a pair of end walls, a horizontally slidable door for said opening, said door being of less width and of greater length than the width and length respectively of said opening, said door having a cutout at one end and a pair of spaced endwise aligning openings in proximity to said end communicating with said cutout, one of said end walls extending through said aligning openings and across the cutout to hinge the door to said structure, said door at said end having one corner cut away to provide an abutment positioned between the longitudinal median and one side edge of the door, one of said side walls formed with a socket opening towards and in alignment with said abutment, a spring mounted on said end wall and bearing against the base of the socket and said abutment, and said door having its other end rabbeted for slidably mounting on said other end wall.

2. In combination, a structure provided with means to form a rectangular door opening having a pair of sides and a pair of end walls, a horizontally slidable door for said opening, said door being of less width and of greater length than the width and length respectively of said opening, said door having a cutout at one end and a pair of spaced endwise aligning openings in proximity to said end communicating with said cutout, one of said end walls extending through said aligning openings and across the cutout to hinge the door to said structure, said door at said end having one corner cut away to provide an abutment positioned between the longitudinal median and one side edge of the door, one of said side walls formed with a socket opening towards and in alignment with said abutment, a spring mounted on said end wall and bearing against the base of the socket and said abutment, said door having its other end rabbeted for slidably mounting on said other end wall, and said door having a socket in proximity to its rabbeted end and opening at its other side edge to removably receive a latching member projecting from the other of said side walls.

3. A spring controlled door for the opening of a chicken coop comprising a body portion of less width and of greater length than the width and length respectively of the opening with which it is associated, said body portion having a cutout at one end and a pair of spaced, endwise aligning openings in proximity to said end and communicating with said cutout for the passage of means for hinging the door to the coop.

OSE F. CARPENTER.